United States Patent
Furukawa et al.

(10) Patent No.: US 10,148,851 B2
(45) Date of Patent: Dec. 4, 2018

(54) IMAGE READING APPARATUS AND IMAGE READING METHOD

(71) Applicant: CANON KABUSHIKI KAISHA, Tokyo (JP)

(72) Inventors: Masato Furukawa, Nagareyama (JP); Seiji Shibaki, Abiko (JP); Yushi Oka, Abiko (JP); Kaoru Hamada, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/847,588

(22) Filed: Dec. 19, 2017

(65) Prior Publication Data

US 2018/0183968 A1   Jun. 28, 2018

(30) Foreign Application Priority Data

Dec. 26, 2016   (JP) ................. 2016-250599

(51) Int. Cl.
*H04N 1/32* (2006.01)
*H04N 1/00* (2006.01)

(52) U.S. Cl.
CPC ....... *H04N 1/3263* (2013.01); *H04N 1/00013* (2013.01); *H04N 1/00037* (2013.01); *H04N 1/00084* (2013.01); *H04N 1/00588* (2013.01); *H04N 1/00689* (2013.01); *H04N 1/00694* (2013.01); *H04N 1/00697* (2013.01); *H04N 1/00777* (2013.01); *H04N 2201/0081* (2013.01)

(58) Field of Classification Search
CPC ............. H04N 1/3263; H04N 1/00013; H04N 1/00037; H04N 1/00084; H04N 1/00588; H04N 1/00689; H04N 1/00694; H04N 1/00697; H04N 1/00777; H04N 2201/0081

See application file for complete search history.

(56) References Cited

U.S. PATENT DOCUMENTS

2003/0007180 A1* 1/2003 Urasawa ................ G06K 15/02
                                                                    358/1.16
2004/0184824 A1* 9/2004 Hirai ...................... G03G 15/70
                                                                    399/21

FOREIGN PATENT DOCUMENTS

JP    2000-050005    2/2000
JP    2004-080548    3/2004

* cited by examiner

*Primary Examiner* — Iriana Cruz
(74) *Attorney, Agent, or Firm* — Fitzpatrick, Cella, Harper & Scinto

(57) ABSTRACT

An image reading apparatus reads an original image of an original, which is conveyed along a conveyance path, using a scanner unit and a CCD sensor unit. A separation sensor, a lead sensor, and a sheet discharge sensor, which are provided to the conveyance path, detect occurrence of a jam. A restarting method for reading processing of the original after the occurrence of the jam includes a first restarting method of re-placing all of the originals, which have been fed, on an original tray and a second restarting method of re-placing only an unread original on the original tray, and is set by a user. In a case where the second restarting method is set, the restarting method is determined from any one of the first restarting method and the second restarting method based on a discharged length of the original having been discharged to a sheet discharge tray.

8 Claims, 11 Drawing Sheets

IMAGE READING APPARATUS AND IMAGE READING METHOD

BACKGROUND OF THE INVENTION

Field of the Invention

The present invention relates to an image reading apparatus, which is configured to read an image of an original (original image).

Description of the Related Art

Some image forming apparatus such as a copying machine and a facsimile include an image reading apparatus for reading an original image. The image reading apparatus is capable of successively reading original images from a plurality of originals using an automatic document feeder (hereinafter referred to as "ADF"). The originals are placed on an original tray of the ADF, and are successively fed from the original tray to the image reading apparatus. The image reading apparatus performs a scanning operation of optically reading the originals fed from the ADF while conveying the originals, and generating image data representing original images of the originals. The image data is transmitted to the image forming apparatus and is used for image formation by the image forming apparatus.

During the scanning operation using the ADF, in some cases, a conveyance error of an original subjected to reading may occur, with the result that the original is brought into the state of being retained in a conveyance path (sheet jamming state, which is hereinafter referred to as "jam"). When the jam continues for a predetermined time period, the ADF detects occurrence of the conveyance error, and stops the conveyance of the originals. In this case, the original which is retained in the conveyance path and the originals which are kept on the original tray remain while original images thereof are not read. Therefore, a reading job remains incomplete and is not terminated. In such a state, the image reading apparatus typically cancels the reading job temporarily, and performs re-reading of all the originals including the originals having been normally read.

However, the operation of re-reading the originals having been read before occurrence of the jam is inefficient. In Japanese Patent Application Laid-open No. 2004-80548, the following method has been proposed. That is, in a case in which originals which have not been read are re-placed on the original tray after occurrence of a jam, the read originals are skipped, and reading is restarted from the originals which have not been read. According to the proposed method, for example, even when a high-quality mode is set, and thus the reading speed is slow, the read originals are skipped at high speed (only the conveyance is performed, and reading is not performed), thereby being capable of performing the processing of the entire reading job at high speed. However, even in this case, the read originals are re-placed on the original tray, and hence it is necessary to convey the read originals again. For example, in a reading job of reading hundred originals, when the jam occurs at a ninety-ninth sheet, ninety-nine sheets are re-conveyed. Therefore, such an operation is not efficient.

In Japanese Patent Application Laid-open No. 2000-50005, there has been proposed a method of performing a reading job again without requiring re-placement on the original tray for read originals having been delivered at the time of occurrence of a jam. With this method, there is no need to re-convey the read originals. The originals to be re-placed on the original tray are originals which have not been read at the time of occurrence of the jam and read originals which are minimum required. This method reduces the number of read originals subjected to re-conveyance, thereby being capable of efficiently performing the reading job.

When the originals to be re-placed on the original tray are limited to originals which have not been read at the time of occurrence of the jam, there arises a problem of handling of originals which have not been completely delivered from the ADF after reading. For example, in some cases, handling of originals expected on the image forming apparatus side and handling of originals determined by a user do not match.

Specifically, when an image reading apparatus determines whether or not originals are to be re-placed on the original tray in accordance with a detection result of a sheet discharge sensor provided at a discharge port of the ADF, handling of originals by the image reading apparatus and handling of originals by a user do not match depending on a discharge state of originals. For example, a user who considers that originals need to be re-placed when the originals are not completely delivered may re-place read originals, which have not been completely delivered from the discharge port, on the original tray even when the image reading apparatus determines, using the sheet discharge sensor, that the originals have been delivered. Meanwhile, a user, who considers that there is no need to re-place originals when a large fraction of the originals have been delivered, does not re-place the originals as long as the large fraction of the originals have been delivered even when the image reading apparatus determines, using the sheet discharge sensor, that the originals have not been delivered and even when the originals are unread originals. In any of those cases, the operation of efficiently reading all of the originals is hindered.

In view of the above-mentioned problems, the present invention has a main object to provide an image reading apparatus, which is capable of efficiently performing re-reading of originals at the time of occurrence of a jam.

SUMMARY OF THE INVENTION

An image reading apparatus, according to the present disclosure including: an original tray for placing an original; a conveyance unit configured to convey the original, which is fed from the original tray, to a conveyance path; an image reader configured to read an image of the original conveyed along the conveyance path; a jam detector configured to detect occurrence of a jam of the original on the conveyance path; a sheet discharge tray to which an original having been subjected to reading of an original image by the image reader is discharged; and a controller, which is configured to stop conveyance of the original by the conveyance unit in a case where the jam is detected by the jam detector, determine, based on a discharged length of a length of an original which stops in the course of being discharged to the sheet discharge tray, a restarting method for reading processing of the original after release of the jam from any one of a first restarting method of re-placing all originals, which have been fed from the original tray, on the original tray and a second restarting method of re-placing an original not having been completely discharged to the original tray, and give a notification of the determined restarting method using a predetermined notification unit.

Further features of the present invention will become apparent from the following description of exemplary embodiments (with reference to the attached drawings).

DESCRIPTION OF THE EMBODIMENTS

Figure 1:
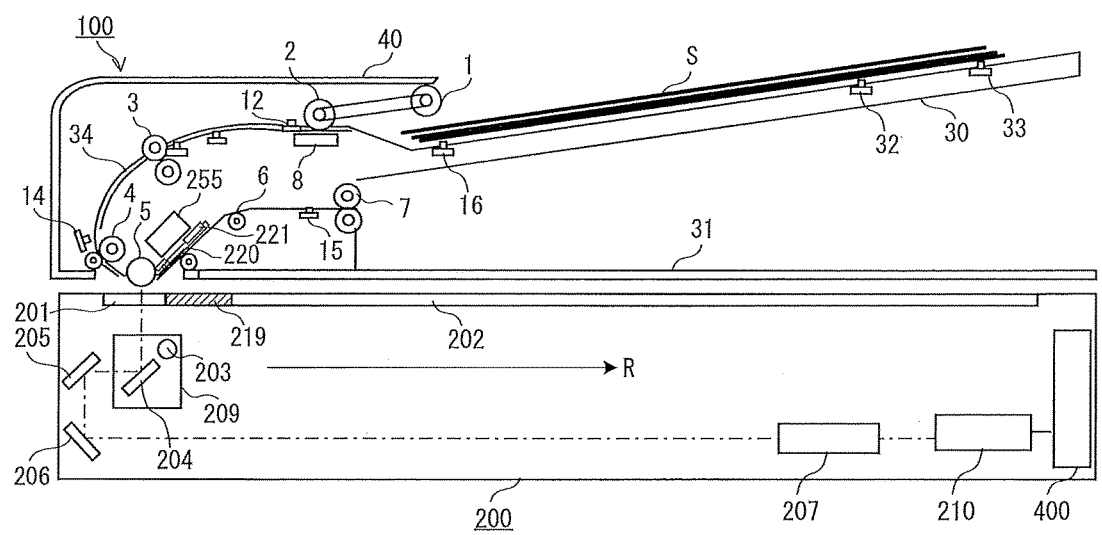
FIG. 1 is a view for illustrating a configuration of an image reading apparatus.

Now, an embodiment of the present invention is described in detail with reference to the drawings.
Overall Configuration FIG. 1 is a view for illustrating a configuration of an image reading apparatus according to the embodiment of the present invention. An image reading apparatus 200 includes an automatic document feeder (ADF) 100. The ADF 100 is capable of successively feeding originals S one after another to the image reading apparatus 200. The image reading apparatus 200 reads an image of one surface (front surface) of the original S, and the ADF 100 reads an image of another surface (back surface) of the original S.
Configuration of ADF The ADF 100 includes an original tray 30, a conveyance path 34, and a sheet discharge tray 31. The originals S subjected to reading are placed on the original tray 30. The original tray 30 includes an original presence sensor 16 and two original size sensors 32 and 33. The original presence sensor 16 is an original presence detector configured to detect presence of the originals S on the original tray 30. The original size sensor 33 detects a widthwise length (length in a direction orthogonal to a conveyance direction) of the originals placed on the original tray 30. The original size sensor 32 detects a longitudinal length (length in the conveyance direction) of the originals placed on the original tray 30.

The conveyance path 34 is a path for allowing the originals S stacked on the original tray 30 to be delivered one after another to the sheet discharge tray 31 via a reading position of the image reading apparatus 200. Along the conveyance path 34, there are provided a sheet feeding roller 1, a separation roller 2, a registration roller pair 3, an upstream lead roller pair 4, an original reading platen roller 5, a downstream lead roller 6, and a sheet discharge roller pair 7, which are arranged in the order from the upstream side in the conveyance direction of the originals. The separation roller 2 has a separation pad 8 which is provided at a position opposed to the separation roller 2 across the conveyance path 34. The rollers convey the originals S along the conveyance path 34. Along the conveyance path 34, there are provided various sensors such as a separation sensor 12, a lead sensor 14, and a sheet discharge sensor 15, which are arranged in the order from the upstream side in the conveyance direction of the originals. The separation sensor 12 is arranged in the vicinity of the separation roller 2 between the separation roller 2 and the registration roller pair 3. The lead sensor 14 is arranged in the vicinity of the upstream lead roller pair 4 between the registration roller pair 3 and the upstream lead roller pair 4. The sheet discharge sensor 15 is arranged in the vicinity of the sheet discharge roller pair 7 between the downstream lead roller 6 and the sheet discharge roller pair 7. The sensors detect the originals S which are conveyed along the conveyance path 34.

The ADF 100 includes a reading platen glass 220 for a back surface of the original. The reading platen glass 220 is provided between the original reading platen roller 5 and the downstream lead roller 6 along the conveyance path 34, and includes a reference white plate 221 for a back surface of the original. Further, the ADF 100 includes a contact image sensor (CIS) unit 255 configured to read original images of the back surfaces of the originals S at a position of the reading platen glass 220 as a reading position. The CIS unit 255 has a main scanning direction extending in the direction orthogonal to the conveyance direction of the originals S, and reads original images of the back surfaces of the originals S which are conveyed through the reading position. The CIS unit 255 transmits, to a controller 400, image signals representing the read original images of the back surfaces.
Configuration of Image Reading Apparatus The image reading apparatus 200 includes a reading glass 201, an original table glass 202, and a reference white plate 219 a front surface of the original, which are arranged at positions opposed to the ADF 100. The image reading apparatus 200 includes mirrors 205 and 206, a lens 207, an optical scanner unit 209, a charge coupled device (CCD) sensor unit 210, and the controller 400, which are arranged inside the image reading apparatus 200. The scanner unit 209 and the CCD sensor unit 210 construct a reading unit configured to read original images of the front surfaces of the originals S. The reading glass 201 is arranged at a position opposed to the original reading platen roller 5. The original S is placed on the original table glass 202 when an original image of the original S is to be read without use of the ADF 100. The original S is placed on the original table glass 202 so that a surface to be read faces downward. The reference white plate 219 is provided between the reading glass 201 and the original table glass 202, and is read when reference data of white levels for shading is to be created.

The scanner unit 209 includes a light source lamp 203 and a mirror 204. The light source lamp 203 irradiates light to the conveyance path 34 of the ADF 100 over the reading glass 201. The light having been irradiated is reflected by a surface of the original S conveyed along the conveyance path 34.

The reflected light from the original S is reflected by the mirrors 204, 205, and 206, and is condensed by the lens 207 to a light receiving surface of the CCD sensor unit 210. The CCD sensor unit 210 performs photoelectric conversion of the reflected light having been received, to thereby generate an image signal representing an original image. A position on the conveyance path 34 to which the light is irradiated by the light source lamp 203 corresponds to a reading position of the image reading apparatus 200. The scanner unit 209 irradiates light to form one line extending in the direction orthogonal to the conveyance direction of the original S. Therefore, the direction orthogonal to the conveyance direction of the original S corresponds to the main scanning direction. The conveyance direction of the original S is the same as a sub-scanning direction. When the original S on the original table glass 202 is to be read, the scanner unit 209 irradiates light while moving in a direction indicated by the arrow R. In this case, the direction indicated by the arrow R corresponds to the sub-scanning direction. When the reference white plate 219 is to be read, the scanner unit 209 moves to a position directly below the reference white plate 219 and irradiates light to the reference white plate 219.

The controller 400 acquires image signals from the CCD sensor unit 210 and the CIS unit 255 and performs various image processing to generate image data representing original images. The controller 400 transmits the generated image data to an image forming apparatus (not shown) or an external computer. The controller 400 controls operations of the ADF 100 and the image reading apparatus 200. Details of the controller 400 are described later.

One-side (Front Surface) Reading using ADF

The image reading apparatus 200 operates as follows in a case of reading an original image of a front surface of the original S using the ADF 100.

When a reading job for one side of the original S is started, the image reading apparatus 200 moves the scanner unit 209 to a position directly below the reference white plate 219 and executes shading correction. The image reading apparatus 200 uses the scanner unit 209 to irradiate light to the reference white plate 219, and receives reflected light at the CCD sensor unit 210, to thereby read the reference white plate 219. The image reading apparatus 200 performs the shading correction in accordance with a reading result. The scanner unit 209 moves to a position directly below the reading glass 201 after the shading correction, and waits until the original S is conveyed to the reading position by the ADF 100.

The ADF 100 starts conveyance of the originals S from the original tray 30. The ADF 100 feeds the originals S, which are stacked on the original tray 30, one after another by the sheet feeding roller 1. When the sheet feeding roller 1 does not perform the conveyance of the originals, the sheet feeding roller 1 is supported at a position apart from the original tray 30. At the time of conveyance of the originals, the sheet feeding roller 1 falls to the original tray 30 side and rotates thereat. With this action, the sheet feeding roller 1 feeds, to the conveyance path 34, an uppermost original S of a bundle of originals placed on the original tray 30. That is, when a plurality of originals S are stacked on the original tray 30, the sheet feeding roller 1 sequentially feeds the originals S from the uppermost original S. The separation roller 2 and the separation pad 8 separate, one after another, the originals S fed by the sheet feeding roller 1. With this action, the originals S are conveyed one after another along the conveyance path 34. The separation roller 2 conveys the original S to the registration roller pair 3. The separation of the originals S performed by the sheet feeding roller 1, the separation roller 2, and the separation pad 8 is achieved by known separation processing technologies.

The registration roller pair 3 is stopped when the original S is conveyed by the separation roller 2. Therefore, the original S temporarily stops under a state in which a side of a leading edge of the original S (original leading edge) in the conveyance direction is held in abutment against the registration roller pair 3. After that, the original S is conveyed by the separation roller 2 by a small distance so that warpage is formed in the original S. Through formation of the warpage, skew feed of the original S is corrected. The controller 400 transmits an image reading notification request to the image reading apparatus 200 under a state in which reading of an image signal is ready. The image reading apparatus 200 receives the image reading notification request, and instructs the ADF 100 to restart the conveyance of the original S. With this action, the registration roller pair 3 conveys the original S having been subjected to the skew correction to the upstream lead roller pair 4.

The upstream lead roller pair 4 conveys the original S to the reading position of the scanner unit 209, which is located between the original reading platen roller 5 and the reading glass 201.

In this case, the lead sensor 14 detects an original leading edge of the original S. A distance from a position at which the lead sensor 14 detects the original leading edge of the original S to the reading position of the scanner unit 209 is counted by clocks of a conveyance motor (not shown) serving as a drive source for the upstream lead roller pair 4 and the original reading platen roller 5. With this action, the reading position of the scanner unit 209 is accurately measured. A timing of passing through the measured reading position is determined as an original image leading edge reference position of the front surface of the original S. Based on the original image leading edge reference position having been determined, image reading for the front surface of the original S by the scanner unit 209 is performed.

When a trailing edge (original trailing edge) of the conveyed original S in the conveyance direction is detected by the separation sensor 12, the presence of an original to be read next is detected by the original presence sensor 16. A detection result of the original presence sensor 16 is notified to the controller 400. The original S is conveyed by the separation roller 2, the registration roller pair 3, the upstream lead roller pair 4, the original reading platen roller 5, and the downstream lead roller 6 in the stated order, and an original trailing edge thereof is detected by the sheet discharge sensor 15. With the detection of the original trailing edge by the sheet discharge sensor 15 as a trigger, the original S is delivered from the sheet discharge roller pair 7 to the sheet discharge tray 31 after elapse of a predetermined time period. In such a manner, an original image of a front surface of one original S is read, and the image reading sequence for the front surface is terminated.

As described above, operations of feeding the original S, reading the original image, and delivering the original S are basically repeated until an original is no longer present on the original tray 30, except for the case in which original images of a set number of originals S are read in accordance with setting of the job. In a case in which the next original is not detected by the original presence sensor 16 when the separation sensor 12 detects the original trailing edge, that is, in a case in which an original is no longer present on the original tray 30, the controller 400 determines that the original being conveyed is the last read original. In this case, after the original is delivered to the sheet discharge tray 31, the conveyance motor serving as a drive source for the rollers is stopped, and the sheet feeding roller 1 returns to an original position apart from the original tray 30. Then, the reading job is terminated.

Duplex Reading using ADF

The image reading apparatus 200 operates as follows in a case of reading original images of both surfaces of the original S using the ADF 100. The reading operation for the original image of the front surface is described above. A reading operation for an original image of the back surface is performed as follows.

Before the back surface of the original S is to be read, the reference white plate 221 moves to a position on extension of the reading position of the CIS unit 255. After the reference white plate 221 has moved, the CIS unit 255 reads the reference white plate 221. With this action, the shading correction for the CIS unit 255 is performed. After the shading correction is terminated, the reference white plate 221 returns to an original position.

The operations of feeding, conveying, and delivering the original S are the same as those performed during the one-side reading. In the case of duplex reading, after the front surface of the original S is read by the scanner unit 209, the original S is conveyed by the original reading platen roller 5 to the reading platen glass 220 being the reading position of the CIS unit 255. The CIS unit 255 reads, from the original S being conveyed, an original image of the back surface of the original S. The downstream lead roller 6 conveys, to the sheet discharge roller pair 7, the original S having passed through the reading position of the CIS unit 255. The sheet discharge roller pair 7 delivers the original S to the sheet discharge tray 31. In such a manner, the original image of the back surface of one original S is read, and the image reading sequence for the back surface is terminated.

Control System

Figure 2:
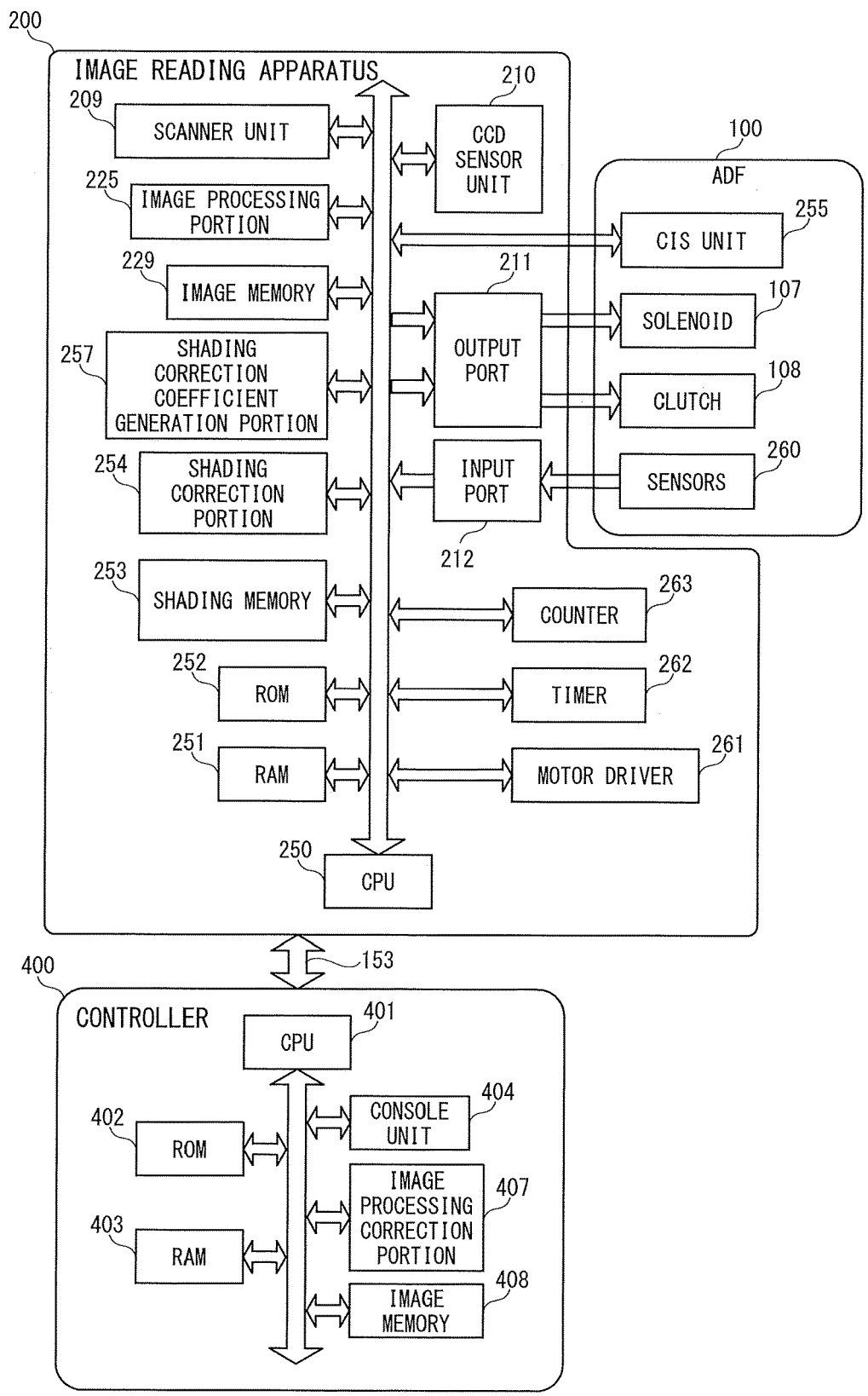
FIG. 2 is a diagram for illustrating a configuration of a control system.

FIG. 2 is a diagram for illustrating a configuration of a control system for the ADF 100, the image reading apparatus 200, and the controller 400. The controller 400 controls operations of an entirety including the ADF 100 and the image reading apparatus 200. The image reading apparatus 200 and the controller 400 are connected to each other by a communication line 153 and perform communication through the communication line 153.

The image reading apparatus 200 includes a computer which includes a central processing unit (CPU) 250, a random access memory (RAM) 251, and a read only memory (ROM) 252. The CPU 250 uses the RAM 251 as a working area to execute a computer program stored in the ROM 252, to thereby control operations of the image reading apparatus 200 and the ADF 100. The image reading apparatus 200 includes the scanner unit 209, the CCD sensor unit 210, an image processing portion 225, an image memory 229, a counter 263, a timer 262, and a motor driver 261. Further, for the shading correction, the image reading apparatus 200 includes a shading correction coefficient generation portion 257, a shading correction portion 254, and a shading memory 253. The image reading apparatus 200 includes an output port 211 and an input port 212 as interfaces with respect to the ADF 100. The ADF 100 includes the CIS unit 255, a solenoid 107, a clutch 108, and sensors 260 provided to the conveyance path 34. The CIS unit 255 and components of the image reading apparatus 200 are connected to the CPU 250 through a bus.

The motor driver 261 is a driver circuit configured to drive a conveyance motor and a drive motor to rotate. The conveyance motor is configured to rotate various rollers provided to the conveyance path 34. The drive motor is configured to move the scanner unit 209 in the direction indicated by the arrow R (see FIG. 1). The CPU 250 controls the motor driver 261 to perform conveyance control for the original S and operation control for the scanner unit 209. In accordance with an instruction given by the CPU 250, the image processing portion 225 performs image processing with respect to image signals acquired from the CCD sensor unit 210 and the CIS unit 255.

The CPU 250 controls the shading correction coefficient generation portion 257 to generate a shading correction coefficient. The shading correction coefficient generation portion 257 acquires a reading result of the reference white plate 219 from the CCD sensor unit 210, generates a shading correction coefficient of a front surface, and stores the shading correction coefficient in the shading memory 253. The shading correction coefficient generation portion 257 acquires a reading result of the reference white plate 221 from the CIS unit 255, generates a shading correction coefficient of a back surface, and stores the shading correction coefficient in the shading memory 253. The shading correction portion 254 performs the shading correction with respect to the image signals with use of the shading correction coefficients. The image signal having been subjected to the shading correction by the shading correction portion 254 and the image correction by the image processing portion 225 is stored in the image memory 229 as image data representing the read original image. The image data is transmitted to the controller 400 through the communication line 153.

For example, the CPU 250 acquires an image signal of the front surface of the original S from the CCD sensor unit 210, and controls the shading correction portion 254 to perform the shading correction with use of the shading correction coefficient for the front surface. The image processing portion 225 performs predetermined image processing with respect to the image signal of the front surface after the shading correction. The CPU 250 stores the image signal having been subjected to the shading correction and the image correction in the image memory 229 as image data representing the original image of the front surface. Similarly, the CPU 250 acquires an image signal of the back surface of the original S from the CIS unit 255, and controls the shading correction portion 254 to perform the shading correction with use of the shading correction coefficient for the back surface. The image processing portion 225 performs predetermined image processing with respect to the image signal of the back surface after the shading correction. The CPU 250 stores the image signal having been subjected to the shading correction and the image correction in the image memory 229 as image data representing the original image of the back surface.

The timer 262 generates timings required for reading of the original image and conveyance of the original by the ADF 100. The timer 262 generates the timings based on signal intervals of the number of clocks of the CPU 250 and the number of output pulses from the motor driver 261.

The counter 263 counts the number of ON and OFF of sensors such as the lead sensor 14 arranged along the conveyance path 34 among the sensors 260, and the number of image signals acquired from the CCD sensor unit 210 and the CIS unit 255 (number of read originals), and stores the counted numbers.

The image reading apparatus 200 is connected to the solenoid 107 and the clutch 108 of the ADF 100 through the output port 211. The solenoid 107 is used for driving of various rollers provided to the conveyance path 34. The clutch 108 is provided between the various rollers and the conveyance motor, and performs transmission control of a drive force. The image reading apparatus 200 acquires detection results of the various sensors 260 of the ADF 100 through the input port 212. The sensors 260 include the lead sensor 14, the sheet discharge sensor 15, the separation sensor 12, and the original presence sensor 16. The CPU 250 acquires detection results of the various sensors 260 provided to the conveyance path 34, and drives the various rollers provided to the conveyance path 34, the solenoid 107, and the clutch 108, to thereby feed and convey the original S.

At the time of duplex reading of the original S, the operation of the CIS unit 255 is controlled by the CPU 250 so that the CIS unit 255 reads an image of the back surface of the original S. The CIS unit 255 transmits an image signal representing the read original image of the back surface to the CPU 250. The image signal representing the original image of the back surface is subjected to the above-mentioned image processing and shading processing. When the shading of the CIS unit 255 is to be performed, the CPU 250 uses a motor (not shown) to move the reference white plate 221 to the reading position of the CIS unit 255, and allows the CIS unit 255 to read the reference white plate 221.

The controller 400 is a computer which includes a CPU 401, a ROM 402, a RAM 403, an console unit 404, an image processing correction portion 407, and an image memory 408. The CPU 401 uses the RAM 403 as a working area to execute a computer program stored in the ROM 402, to thereby control the operations of the ADF 100 and the image reading apparatus 200. The console unit 404 is a user interface, and receives setting of the reading job and a start instruction for the reading job by a user. The console unit 404 includes various key buttons for receiving instructions and a display device. The CPU 401 transmits a start command for the reading job to the image reading apparatus 200 in accordance with the start instruction for the reading job.

When an image of the original S placed on the original table glass 202 is to be read, the controller 400 acquires an image leading edge signal being a reference for the original reading from the CPU 250 through the communication line 153. When an image of the original S conveyed by the ADF 100 is to be read, the controller 400 refers to the detection of the original leading edge by the lead sensor 14 as a trigger to acquire the image leading edge signal adjusted in timing by the CPU 250 through the communication line 153. The controller 400 refers to the acquired image leading edge signal as a trigger to perform image processing such as magnification processing, image rotation processing, and image filter processing by the image processing correction portion 407 with respect to image data read by the image reading apparatus 200 and transferred from the image memory 229. The controller 400 stores the image data having been subjected to the image processing as final image data in the image memory 408.

Jam Detection

Figure 3:
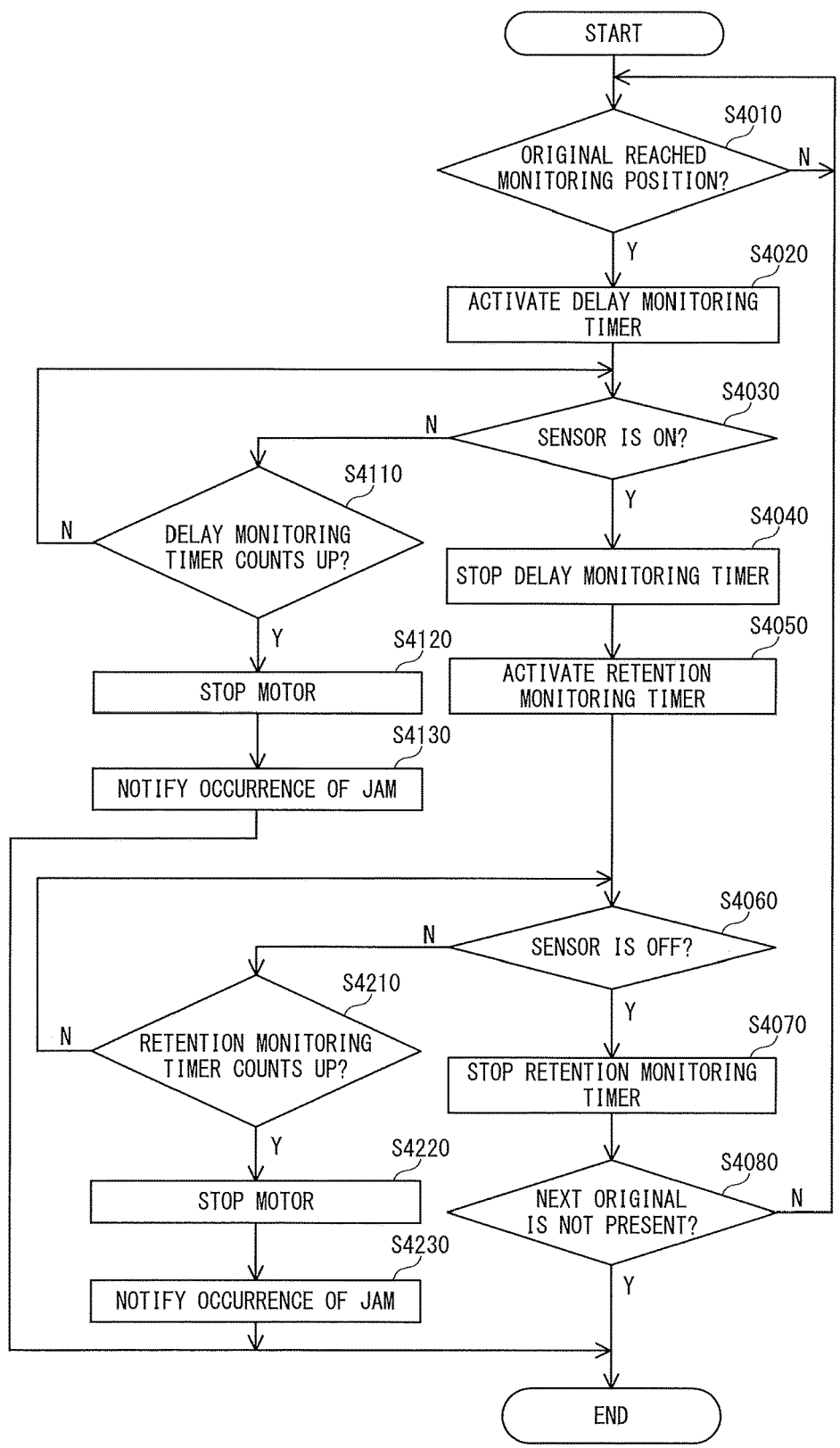
FIG. 3 is a flowchart for illustrating processing of detecting occurrence of a jam at the time of conveyance of originals.

In the image reading apparatus 200 including the ADF 100 described above, a jam may occur during conveyance of the original S by the ADF 100. FIG. 3 is a flowchart for illustrating processing of detecting occurrence of the jam during conveyance of the original S. When the original S has not been detected by a predetermined sensor before a predetermined timing, or the original S is retained on the conveyance path 34 for a predetermined time period or more, the image reading apparatus 200 determines that the jam has occurred. That is, a delay jam or a retention jam with respect to the original S is determined.

The CPU 250 starts the reading job and instructs the ADF 100 to convey the original S. The CPU 250 determines whether or not the original S has reached a monitoring position for the delay jam (Step S4010). The monitoring position for the delay jam is, for example, a position apart by a predetermined distance from the start of conveyance of the original S or a detection range of each sensor provided to the conveyance path 34. The CPU 250 waits until the original S reaches the monitoring position for the delay jam. When the original S has reached the monitoring position for the delay jam (Step S4010: Y), the CPU 250 activates the timer 262 to monitor the delay in conveyance of the original S (Step S4020). The timer 262 herein measures time taken by the original S to reach the monitoring position. The CPU 250 monitors occurrence of the delay jam based on the time measured by the timer 262.

The CPU 250 determines whether or not the original S has been detected by jam detection sensors provided to the conveyance path 34 (Step S4030). The jam detection sensors for detecting the jam of the original S conveyed along the conveyance path 34 are sensors provided to the conveyance path 34, such as the separation sensor 12, the lead sensor 14, and the sheet discharge sensor 15.

When the original S is not detected by the jam detection sensors (Step S4030: N), the CPU 250 determines whether or not the timer 262 counts up (Step S4110). The operation of counting up is determined based on whether or not a count value of the timer 262 has reached a predetermined count value. The predetermined count value is set in accordance with time taken by the original S to reach a detection range of the jam detection sensors from the monitoring position in a case in which the original S is normally conveyed. For example, the predetermined count value is a value corresponding to a duration obtained by giving a margin to a value calculated based on a conveyance speed and the time taken by the original S to be conveyed and reach the detection range of the jam detection sensors from the monitoring position. When the timer 262 does not count up (Step S4110: N), the CPU 250 continues the determination of whether or not the original S has been detected by the jam detection sensors provided to the conveyance path 34 (Step S4030).

When the timer 262 counts up (Step S4110: Y), the CPU 250 determines that a conveyance error (delay) of the original S has occurred. That is, the CPU 250 determines that the jam has occurred because the original S is delayed by the conveyance error and has not reached the predetermined position even after elapse of a predetermined time period. In this case, in order to suppress damage on the original S to minimum, the CPU 250 stops driving of the motor driver 261 (Step S4120). With this, rollers along the conveyance path 34 for conveying the original S are stopped, and conveyance of the original S is stopped. The CPU 250 notifies the controller 400 of the occurrence of the delay jam and terminates the jam detection processing (Step S4130). The controller 400 receives the notification of the occurrence of the delay jam, and notifies a user of the occurrence of the jam by, for example, the display device of the console unit 404.

When the jam detection sensor detects the original S before the timer 262 counts up (Step S4030: Y), the CPU 250 stops the operation of the timer 262 for monitoring the conveyance delay (Step S4040). Then, the CPU 250 activates the timer 262 to monitor the retention of the original S on the conveyance path 34 (Step S4050).

The CPU 250 determines that the original S has not been detected by the jam detection sensors (Step S4060). When the original S is not conveyed from the time point of Step S4030, and the jam detection sensor keeps detecting the original S (Step S4060: N), the CPU 250 determines whether or not the timer 262 counts up (Step S4210). The operation of counting up is determined based on whether or not a count value of the timer 262 has reached a predetermined count value. The predetermined count value is set in accordance with time taken by the trailing edge of the original S to pass through the sensors in the case in which the original S is normally conveyed. For example, the predetermined count value corresponds to a duration obtained by giving a margin to a value calculated based on a conveyance speed and the time taken by the trailing edge of the original S to pass through the jam detection sensors. When the timer 262 does not count up (Step S4210: N), the CPU 250 continues the determination that the original S has not been detected by the jam detection sensors (Step S4060).

When the timer 262 counts up (Step S4210: Y), the CPU 250 determines that the conveyance error (delay) of the original S has occurred. That is, the CPU 250 determines that the jam has occurred because the original S is retained by the conveyance error and has not passed through the predetermined position even after elapse of a predetermined time period. In this case, in order to suppress damage on the original S to minimum, the CPU 250 stops driving of the motor driver 261 (Step S4220). With this, the rollers along the conveyance path 34 for conveying the original S are stopped, and conveyance of the original S is stopped. The CPU 250 notifies the controller 400 of the occurrence of the retention jam and terminates the jam detection processing (Step S4230). The controller 400 receives the notification of the occurrence of the retention jam, and notifies a user of the occurrence of the jam by, for example, the display device of the console unit 404.

When the original S is conveyed, and the original S is not detected by the jam detection sensors before the timer 262 counts up (Step S4060: Y), the CPU 250 stops the operation of the timer 262 for monitoring the retention of the original S on the conveyance path 34 (Step S4070). The CPU 250 uses the original presence sensor 16 to determine the presence of the next original on the original tray 30 (Step S4080). When the next original is present (Step S4080: N), the CPU 250 repeatedly performs the processing of Step S4010 and subsequent processing until an original is no longer present on the original tray 30. When the next original is not present (Step S4080: Y), the CPU 250 terminates the jam detection processing.

Such jam detection processing is performed with ON/OFF of the sensors, which are used for the conveyance control during the reading job, as a trigger. The jam detection processing may be performed with other triggers. For example, when a cover of the image reading apparatus 200 or the ADF 100 is opened by a user during conveyance of the original S, or when the ADF 100 is opened, normal conveyance of the original S cannot be performed. In this case, the CPU 250 detects opening of the cover or the ADF 100 and determines that the jam has occurred. Further, as protection processing for the case in which unexpected operation due to erroneous detection of the sensors caused by, for example, electric noise occurs, the CPU 250 may detect an operation other than the normal operation of the sensors to determine that the jam has occurred, and stop the conveyance of the original S.

Re-reading after Occurrence of Jam

Figure 4A:
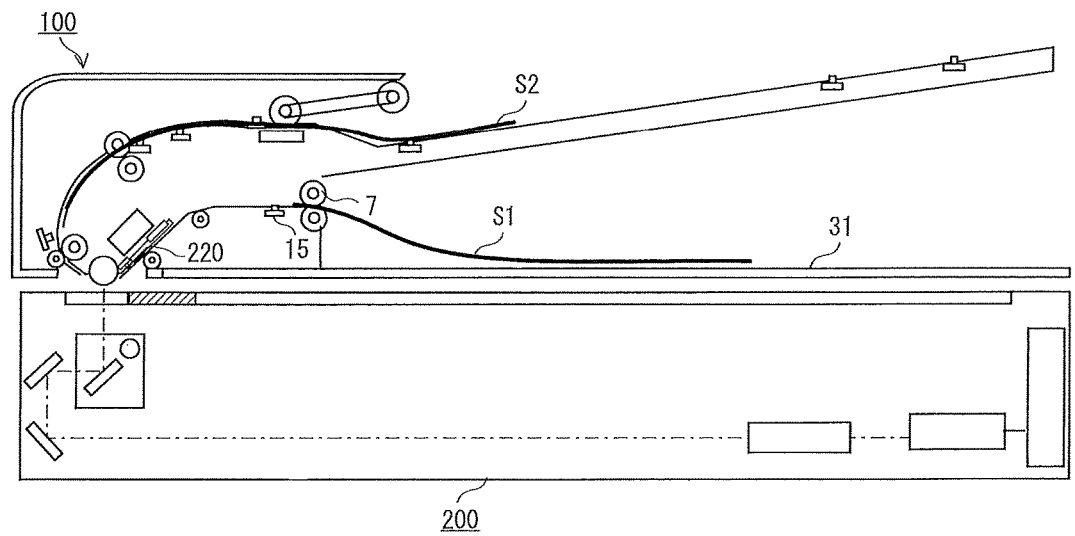
FIG. 4A and FIG. 4B are explanatory views for illustrating positions of originals in an ADF at the time of occurrence of the jam.
Figure 4B:
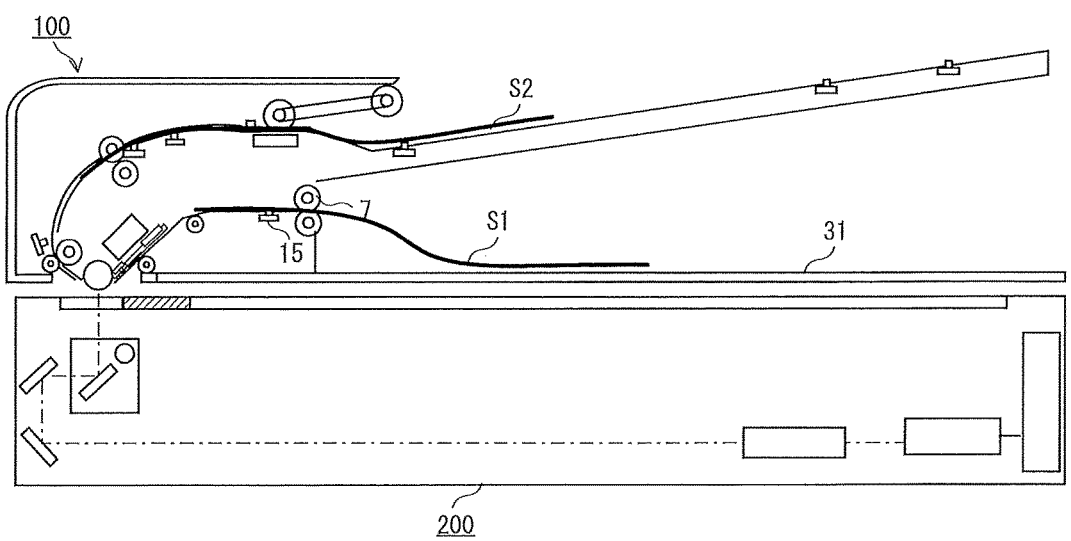

FIG. 4A and FIG. 4B are explanatory views of positions of the originals S in the ADF 100 when the conveyance of the originals S is stopped due to the occurrence of the jam. In each of FIG. 4A and FIG. 4B, there is illustrated a state in which the conveyance is stopped during the course of delivering an original S1 from the ADF 100. In FIG. 4A, a trailing edge of the original S1 has been conveyed to a position after passage of the trailing edge through the sheet discharge sensor 15. In FIG. 4B, the trailing edge of the original S1 has not passed through the sheet discharge sensor 15. In those states, when the re-reading of the original is performed after occurrence of the jam, the determination of whether or not to perform the re-reading of the original S1 differs depending on users. In any of the cases of FIG. 4A and FIG. 4B, there are a user who determines that re-reading of the original S1 is not necessary, and a user who determines that re-reading of the original S1 is necessary.

In the case of FIG. 4A, the trailing edge of the original S1 has passed through the sheet discharge sensor 15, and hence re-reading of the original S1 is not necessary according to the determination of the ADF 100. Meanwhile, in the case of FIG. 4B, the trailing edge of the original S1 has not passed through the sheet discharge sensor 15, and hence re-reading of the original S1 is necessary according to the determination of the ADF 100. The difference between the determination of the ADF 100 and the determination of a user causes problems such as irrelevant reading operation, irrelevant consumption of toner during copying, or non-reading of the original S1.

Figure 5:
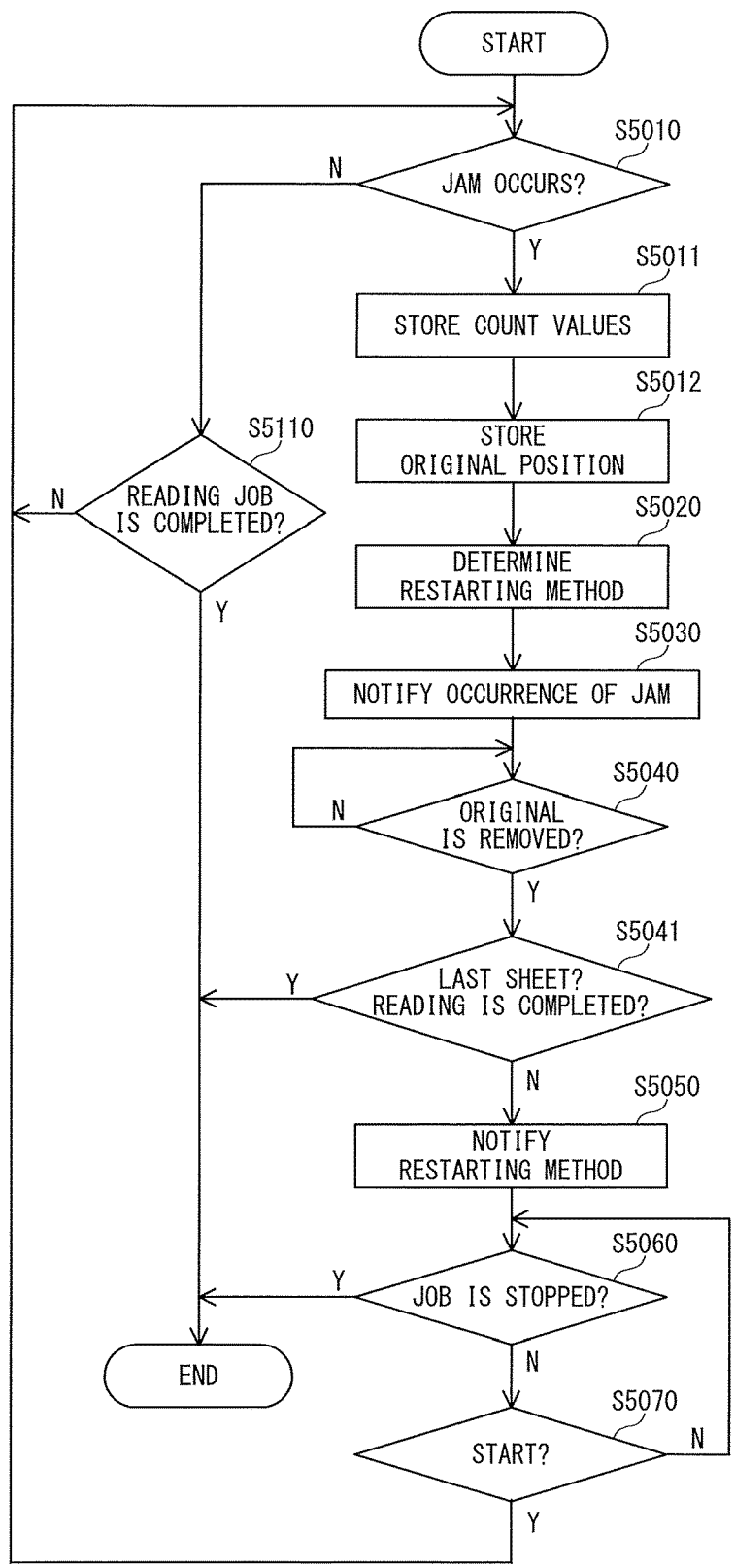
FIG. 5 is a flowchart for illustrating re-reading processing after occurrence of the jam.

In this embodiment, in order to solve such problems, the re-reading processing after the occurrence of the jam is performed as follows. FIG. 5 is a flowchart for illustrating the re-reading processing after the occurrence of the jam.

When the reading job is started, the CPU 250 monitors occurrence of the jam by the processing of FIG. 3 (Step S5010). The CPU 250 periodically checks whether or not the notification by the processing of, for example, Step 4130 and Step 4230 of FIG. 3 has been performed, to thereby monitor the occurrence of the jam.

When the jam does not occur (Step S5010: N), the CPU 250 determines whether or not reading of all of the original images of the originals has been terminated (Step S5110). For example, when an original stacked on the original tray 30 is not detected by the original presence sensor 16, and a trailing edge of the last original being conveyed passes through the sheet discharge sensor 15, the CPU 250 determines that all of the original images of the originals have been read. When reading of all of the original images of the originals is terminated (Step S5110: Y), the CPU 250 terminates this processing. When the reading of the original images of the originals is not terminated (Step S5110: N), the CPU 250 monitors again the occurrence of the jam (Step S5010).

When the jam occurs (Step S5010: Y), the CPU 250 stores count values in the counter 263 (Step S5011). The counter 263 counts three values including the number A of fed originals, the number B of read originals, and the number C of delivered originals. The CPU 250 counts the number A of fed originals in accordance with a detection result of the separation sensor 12. The CPU 250 counts the number B of read originals by acquiring an image signal from the CCD sensor unit 210 or the CIS unit 255. The CPU 250 counts the number C of delivered originals in accordance with a detection result of the sheet discharge sensor 15. After the count values are stored, the CPU 250 stores in the RAM 251 a position of each original conveyed along the conveyance path 34 in the ADF 100 at the time of occurrence of the jam (Step S5012). The position of the original is derived from elapsed time from detection of the original by each sensor with detection results of the sensors such as the separation sensor 12, the lead sensor 14, and the sheet discharge sensor 15 as a trigger. The CPU 250 determines the restarting method for the reading job based on the count values stored in the counter 263 and the position of each original stored in the RAM 251 (Step S5020). Details of the restarting method for the reading job are described later.

Figure 6:
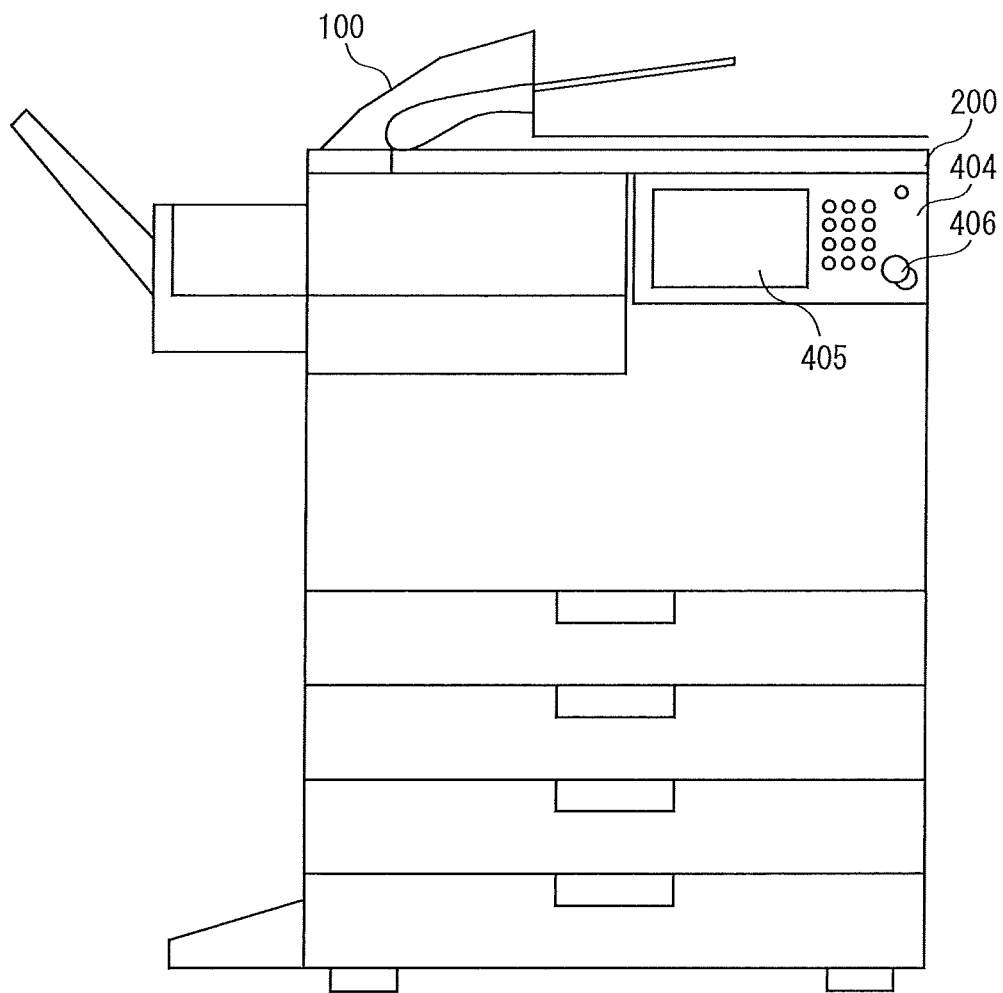
FIG. 6 is an explanatory view for illustrating an console unit.
Figure 7:
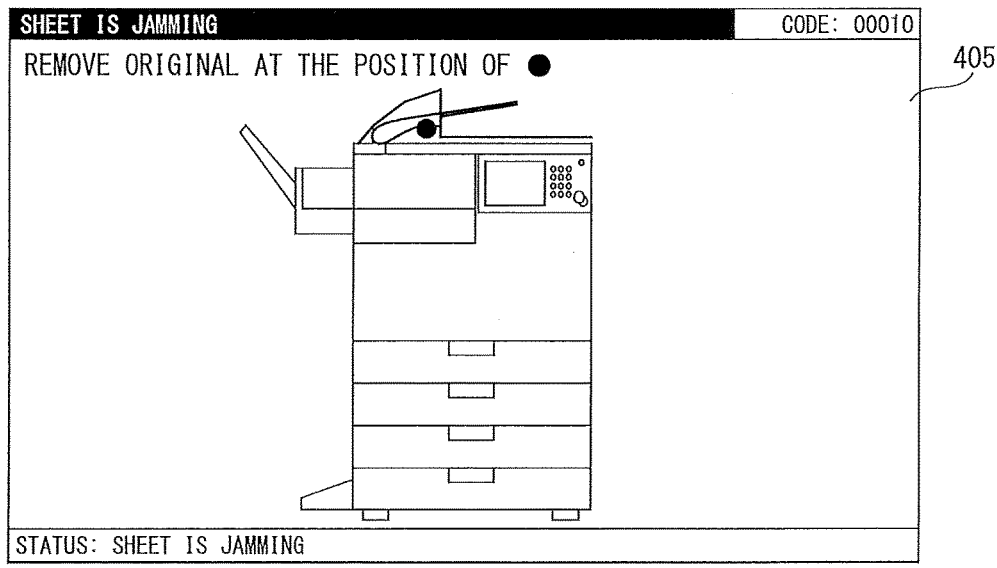
FIG. 7 is a view for illustrating an example of display of information.

When the restarting method is determined, the CPU 250 performs notification of occurrence of the jam to a user (Step S5030). The notification performed in the processing of Step S4130 and Step S4230 of FIG. 3 is an urgent notification of the occurrence of the jam to the user, whereas the notification performed in this case is detailed notification including a method of addressing the jam. The CPU 250 transmits, to the CPU 401 of the controller 400, information such as occurrence of the jam, a type of the jam (delay or retention), and a position of occurrence of the jam through the communication line 153. The controller 400 receives the information and notifies a user of the information by, for example, the display device of the console unit 404. FIG. 6 is an explanatory view for illustrating the console unit 404. The console unit 404 includes a display screen 405 and various input keys 406. The controller 400 displays, on the display screen 405, the information acquired from the CPU 250. FIG. 7 is a view for illustrating an example of display of information. In FIG. 7, a message for instructing removal of an original and a position of occurrence of the jam indicated by a solid circle are displayed on the display screen 405. With this configuration, a user can visually recognize the position of the occurrence of the jam in an easy manner, and can easily address the jam.

After the notification of the occurrence of the jam, the CPU 250 performs determination of whether or not the original retained in the ADF 100 has been removed (Step S5040). The CPU 250 determines removal of the original based on opening and closing of the cover of the ADF 100, opening and closing of the ADF 100, and detection results of the sensors such as the separation sensor 12, the lead sensor 14, and the sheet discharge sensor 15, which are provided to the conveyance path 34. When the original retained in the ADF 100 is removed (Step S5040: Y), the CPU 250 determines whether or not the original determined as causing the jam is the last sheet for the reading job and whether or not the original has been read (Step S5041). The CPU 250 performs this determination based on the fact that the original has not been detected by the original presence sensor 16 (original is not present on the original tray 30), and based on whether or not all of the count values A, B, and C stored in the counter 263 match. When the original having been determined as causing the jam is the last sheet for the reading job, and the reading of the original is completed (Step S5041: Y), the CPU 250 terminates this processing. In this case, all of the original images of the originals have been read. Therefore, even though it is determined that the jam has occurred, the restarting method for the reading job is not notified, and the processing is terminated. Further, the message of the occurrence of the jam is deleted.

Figure 8:
FIG. 8 is a view for illustrating an example of display of a message indicating a restarting method.
Figure 9:
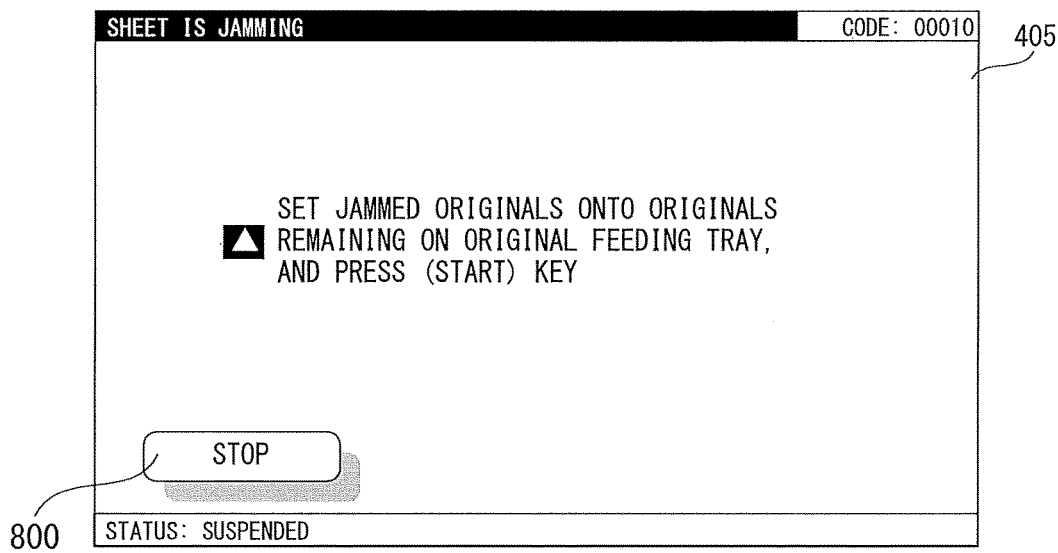
FIG. 9 is a view for illustrating an example of display of a message indicating a restarting method.

When the original having been determined as causing the jam is not the last sheet for the reading job, or the original is the last sheet but is not completely read (Step S5041: N), the CPU 250 notifies a user of the restarting method for the reading job. Similarly to the processing of Step S5030, the CPU 250 allows the display portion 405 of the console unit 404 to display a message indicating the restarting method. FIG. 8 and FIG. 9 are views for illustrating examples of display of the message indicating the restarting method. For example, the display screen 405 of FIG. 8 and FIG. 9 displays contents for suggesting a user how to restart the processing (information about an original to be returned to the original tray 30). At this time, the CPU 250 also displays a stop button 800 for the reading job on the display screen 405 for a user who does not desire restarting of the reading job after the jam processing.

The CPU 250 determines whether or not the stop button 800 has been pressed, and whether or not the input key 406 (see FIG. 6) for instructing the start of reading has been pressed (Step S5060 and Step S5070). The CPU 250 checks pressing of any of the buttons based on input information input from the console unit 404, and performs the above-mentioned determination. When the stop button 800 is pressed (Step S5060: Y), the CPU 250 terminates the processing. When the input key 406 is pressed (Step S5060: N, and Step S5070: Y), the CPU 250 repeatedly performs the processing of Step S5010 and subsequent processing.

Restarting Method

Description is made of the determination processing for the restarting method in Step S5020. The restarting method for the reading job after occurrence of the jam mainly includes two methods. One method is "all return" of re-placing all of the originals, which have been fed from the original tray 30, onto originals remaining on the original tray 30, idly feeding originals having been read, and reading unread originals. Another method is "halfway return" of re-placing originals being retained on the conveyance path 34 onto the originals remaining on the original tray 30, and not performing re-reading of originals having been read.

Figure 10:
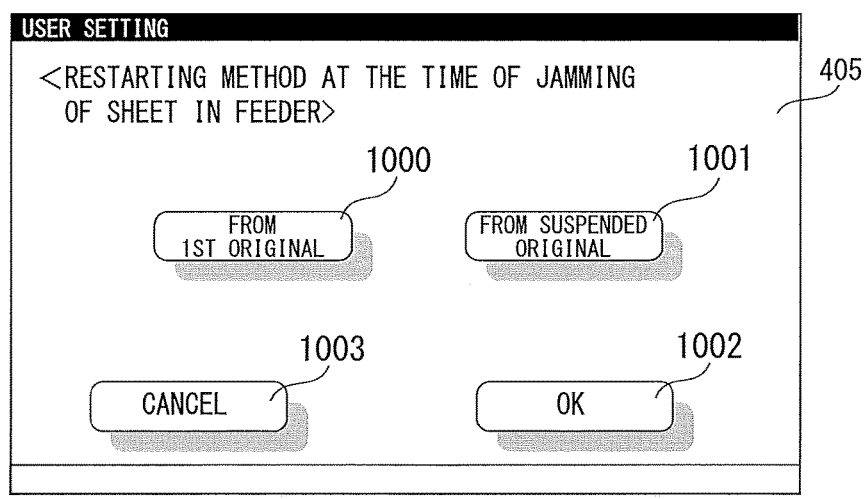
FIG. 10 is a view for illustrating an example of display of a setting screen for the restarting method.

A user performs initial setting using the console unit 404 to set in advance which of the methods is used to restart the reading job. In the determination processing for the restarting method in Step S5020, the restarting method is determined based on this setting. That is, the determination processing for the restarting method in Step S5020 differs in the case in which the "all return" is set and in the case in which the "halfway return" is set. The initial setting for setting of which of the methods is used to restart the reading processing after occurrence of the jam is performed with a setting screen for the restarting method which is exemplified in, for example, FIG. 10. A user selects a button 1000 of the setting screen so that the initial setting of using the "all return" as the restarting method for the reading job after occurrence of the jam can be performed. A user selects a button 1001 of the setting screen so that the initial setting of "halfway return" as the restarting method for the reading job after occurrence of the jam can be performed. Under a state in which a user has not performed the initial setting, the "all return" is set as default setting.

Figure 11A:
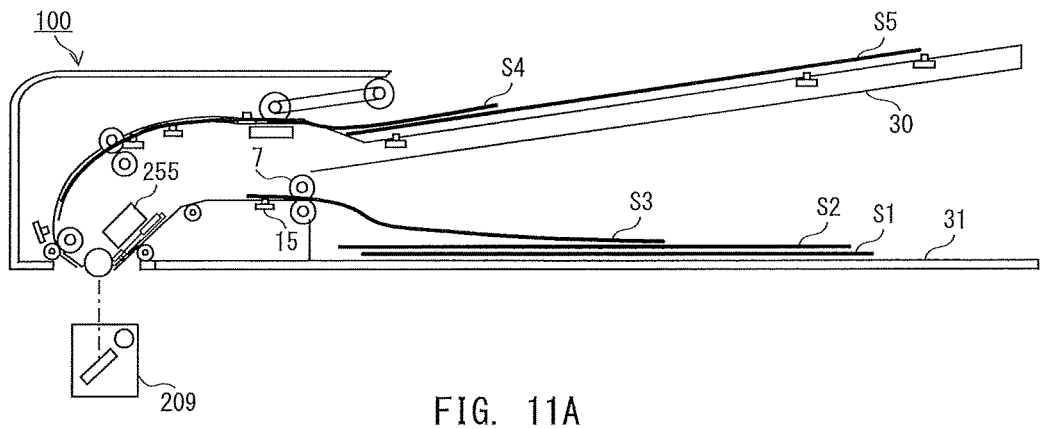
FIG. 11A, FIG. 11B, and FIG. 11C are explanatory views for illustrating determination processing for the restarting method after occurrence of the jam.
Figure 11B:
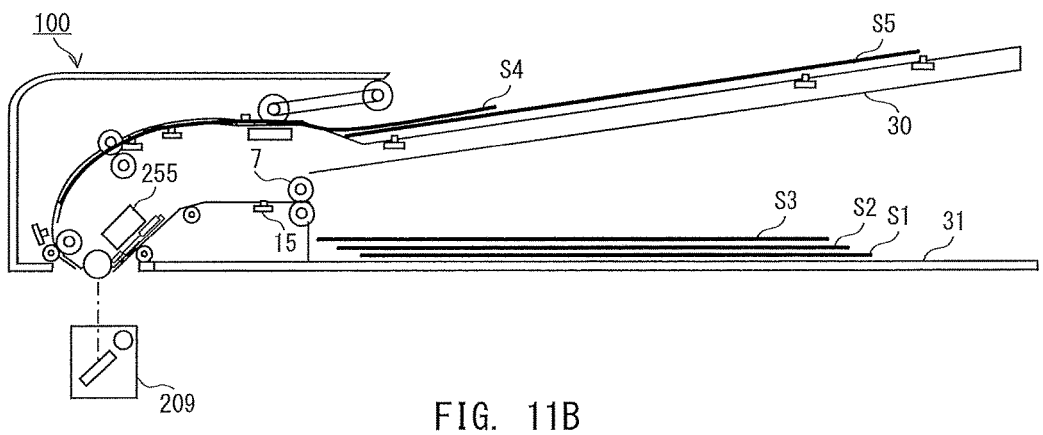
Figure 11C:
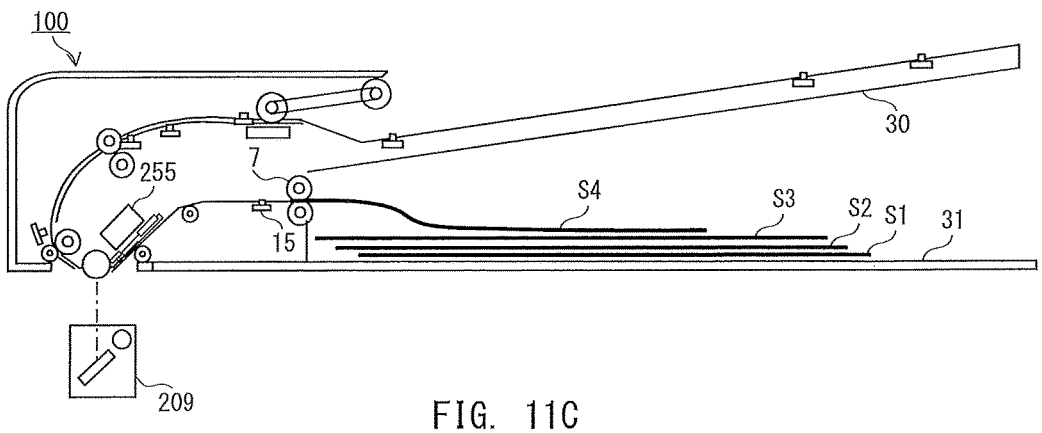

FIG. 11A to FIG. 11C are explanatory views for illustrating the determination processing for the restarting method after occurrence of the jam. FIG. 11A is an illustration of a state in which original images of originals S1 and S2 have been read, and the originals S1 and S2 have been delivered to the sheet discharge tray 31. An original S3 is in the course of being delivered, and an original S4 is in the course of being fed. A trailing edge of the original S3 is located within a detection range of the sheet discharge sensor 15. FIG. 11B is an illustration of a state in which original images of the originals S1, S2, and S3 have been read, and the originals S1, S2, and S3 have been delivered to the sheet discharge tray 31. the original S4 is in the course of being fed. An original S5 remains on the original tray 30 in any of the above-mentioned cases. FIG. 11C is an illustration of a state in which original images of the originals S1, S2, and S3 have been read, and the originals S1, S2, and S3 have been delivered to the sheet discharge tray 31. the original S4 is in the course of being delivered. A trailing edge of the original S4 is located outside the detection range of the sheet discharge sensor 15. In FIG. 11C, it is determined in the processing of Step S5041 that the original having been determined as causing the jam is the last sheet of the reading job and that the original has been read. Therefore, there is no need to restart the reading processing after the occurrence of the jam.

When the "all return" is set, in FIG. 11A, the originals S3 and S4 being retained on the conveyance path 34, the originals S1 and S2 having been delivered, and the original S5 are all re-placed on the original tray 30. In FIG. 11B, the original S4 being retained on the conveyance path 34, the originals S1, S2, and S3 having been delivered, and the original S5 are all re-placed on the original tray 30. Therefore, in the processing of Step S5050, the image reading apparatus 200 allows the display screen 405 of the console unit 404 to display a message as exemplified in FIG. 8 to prompt a user to re-place the originals. When a user re-places the originals on the original tray 30 as instructed and presses the input key 406 for instructing the start of reading, re-reading of the originals is performed. In this case, the ADF 100 performs idle conveyance of the originals at high speed without reading up to the number B of read originals, which is stored in the counter 263, by the processing of Step S5011. Reading of original images is started after the originals having been idly conveyed.

Description is made of related-art processing in the case in which the "halfway return" is set. In this case, in FIG. 11A, it is desired that the originals S3 and S4 and the original S5 be re-placed on the original tray 30. In FIG. 11B, it is desired that the original S4 and the original S5 be re-placed on the original tray 30. That is, it is desired that only the unread originals be re-placed on the original tray 30. Therefore, in the processing of Step S5050, the image reading apparatus 200 allows the display screen 405 of the console unit 404 to display a message as exemplified in FIG. 9 to prompt a user to re-place the originals. When a user re-places the jammed originals on the remaining originals on the original tray 30 as instructed, and presses the input key 406 for instructing the start of reading, re-reading of the originals is performed. In the case of FIG. 11A, reading of the original S3 itself has been completed. Therefore, the ADF 100 performs idle conveyance at high speed without reading of the original S3 which is the first original after the restart of the reading job. This is because the number A of fed originals is larger than the number C of the delivered originals by one. Reading of the original images is started from the original S4 after the idle conveyance. In the case of FIG. 11B, reading of the original images is started from the original S4 which is the first sheet after the restart of the reading job. This is because the number A of fed originals and the number C of delivered originals are equal to each other.

Figure 12A:
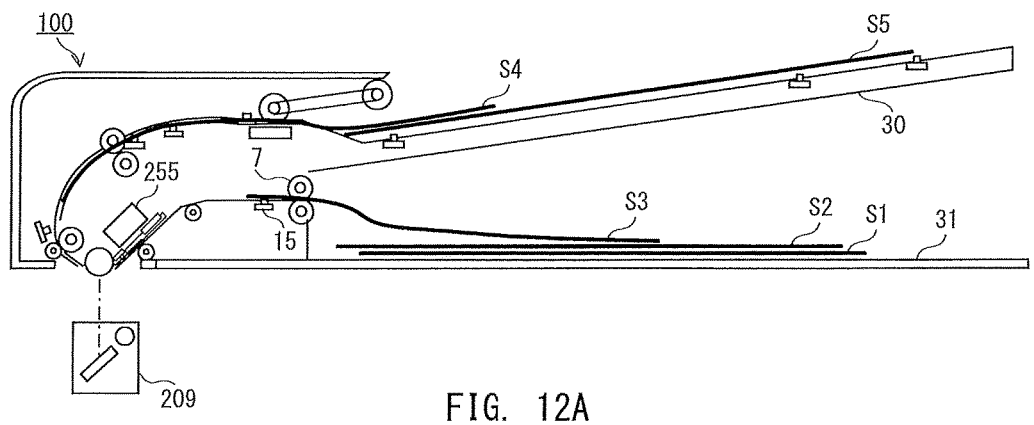
FIG. 12A, FIG. 12B, and FIG. 12C are explanatory views for illustrating positions of the originals at the time of occurrence of the jam.
Figure 12B:
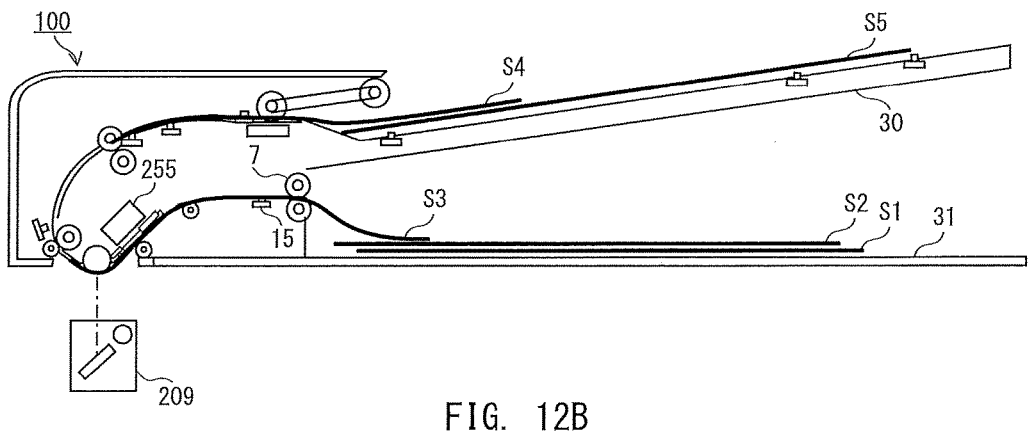
Figure 12C:
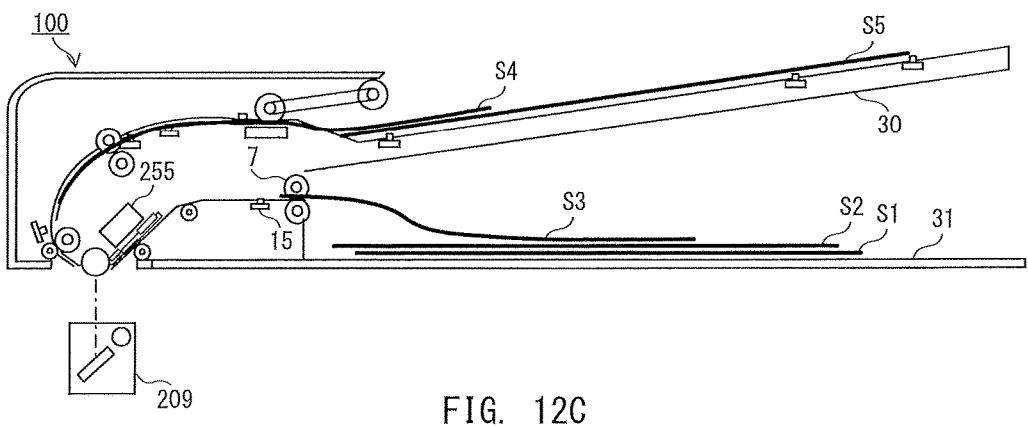

In this embodiment, when the "halfway return" is set, regardless of the setting by a user, the restarting method for the reading job after the occurrence of the jam is determined by the image reading apparatus 200. With reference to FIG. 12A to FIG. 12C, description is made of problems of the related-art processing in the case in which the "halfway return" is set. FIG. 12A to FIG. 12C are explanatory views for illustrating positions of originals at the time of occurrence of the jam.

FIG. 12A is a view similar to FIG. 11A. Original images of the originals S1 and S2 have been read, and the originals S1 and S2 have been delivered to the sheet discharge tray 31. The original S3 is in the course of being delivered, and the original S4 is in the course of being fed. A trailing edge of the original S3 is located within the detection range of the sheet discharge sensor 15. FIG. 12B is an illustration of a state in which conveyance of the original is stopped at a timing slightly earlier than FIG. 12A. Original images of the originals S1 and S2 have been read, and the originals S1 and S2 have been delivered to the sheet discharge tray 31. The original S3 is in the course of being delivered, and the original S4 is in the course of being fed. A trailing edge of the original S3 is located at a reading position of the scanner unit 209. In any of the above-mentioned cases, a part of the original S3 is delivered from the sheet discharge roller pair 7 to the sheet discharge tray 31 at the time of occurrence of the jam.

In the above-mentioned cases, it is desired that the originals S3 and S4 be re-placed on the original tray 30. After the restart of the reading job, in FIG. 12A, it is necessary that reading be started from the original S4. In FIG. 12B, it is necessary that reading be started from the original S3. That is, the operation by a user is the same in any of the above-mentioned cases, but the operation of the image reading apparatus 200 after the restart of the reading job differs. However, depending on users, it may be determined that re-placement of the original S3 is not necessary, for example, in the state of FIG. 12A. In this case, the originals S4 and S5 are re-placed on the original tray 30. In FIG. 12A, the number A of fed originals is larger than the number C of delivered originals by one, and hence the first original is idly conveyed at the time of restart of the reading job. Therefore, the original image of the original S4 is not read unless the original S3 is re-placed.

FIG. 12C is an illustration of a state in which, for example, a user opens the cover of the ADF 100, and the ADF 100 is urgently stopped, with the result that conveyance of the original S3 is stopped in the course of being delivered. In this case, the trailing edge of the original S3 has passed through the sheet discharge sensor 15, and hence the original S3 is regarded as having been delivered similarly to the original S2. However, the trailing edge is nipped by the sheet discharge roller pair 7. Typically, only the originals S4 and S5 are re-placed on the original tray 30. However, depending on users, the original S3 may also be re-placed. The count values stored in the counter 263 at the time of occurrence of the jam are the same as those of the case of FIG. 11B. Therefore, reading of the original images is started from the first original at the time of restart of the reading job. Thus, when the original S3 is re-placed, original image of the original S3 is read twice, and redundant reading of the images occurs.

Those problems arise because a part of the original is nipped by the sheet discharge roller pair 7 at the time of occurrence of the jam, and there is difficulty in determining whether or not the original has been read. Further, the restarting method at the time of occurrence of the jam is set through selection by a user. Therefore, a user who has selected the "halfway return" may have difficulty in determination of the number of originals to be returned depending on the state of the jam.

In this embodiment, as described below, the number of originals to be returned to the original tray 30 at the time of restart of the reading job after the occurrence of the jam is determined, thereby preventing omission of reading and redundant reading after the restart of reading. In this embodiment, when a user is liable to have difficulty in determination of the restarting method at the time of occurrence of the jam, higher priority in determination of the restarting method is given to determination by the image reading apparatus 200 over selection by the user.

In the image reading apparatus 200 according to this embodiment, the number of originals to be returned to the original tray 30 is determined based on the count values given by detection results of the sensors provided to the conveyance path 34 and a length (discharge length) of the original having been delivered to the sheet discharge tray 31 after passing through the sheet discharge roller pair 7 at the time of occurrence of the jam. The count values are stored in the counter 263 in the processing of Step S5011 (see FIG. 5), and include the number A of fed originals, the number B of read originals, and the number C of delivered originals. The discharge length is derived in accordance with a position of each original conveyed along the conveyance path 34, which is stored in the RAM 251 in the processing of Step S5012 (see FIG. 5). For example, the discharge length is derived from a time period from detection of the original by the sheet discharge sensor 15 to occurrence of the jam and a conveyance speed of the original.

For example, when the discharge length is smaller than two-third of the original (FIG. 12B), it is expected that any user determines that the original is being read. In this case, when a user selects the "halfway return", the screen of FIG. 9 is displayed in the processing of Step S5050 of FIG. 5. However, when the discharge length is equal to or larger than two-thirds of the original (for example, FIG. 12A and FIG. 12C), determination with respect to the original may differ depending on users. In this case, higher priority is given to the determination by the image reading apparatus 200. The image reading apparatus 200 instructs a user to return all of the originals, which have been fed from the original tray 30, to the original tray 30. Thus, the image reading apparatus 200 displays the screen of FIG. 8 in the processing of Step S5050 of FIG. 5. With this action, the completion time of the entire reading job including the restart of the reading job becomes longer than that in the case in which the "halfway return" is set, but omission of the original image or redundant reading due to difficulty in determination by a user can be prevented.

The threshold value (two-thirds in the description above) used for the determination of the discharge length may be variable. For example, in a case in which the original is smaller than A4 size, that is, the original has A5 size, even when the discharge length is smaller than two-thirds of the original, the trailing edge is located in the vicinity of the sheet discharge sensor 15. Therefore, there is a case in which a user has difficulty in determination. Thus, in the case of an original having a small size, the threshold value for use in determination of the discharge length may be changed to one-half. In contrast, in a case in which the original is larger than the A4 size, that is, the original has A3 size, even when the discharge length is equal to or larger than two-thirds of the original, a user is less liable to have difficulty in determination as long as a sufficient length of the trailing edge remains on the conveyance path 34. Therefore, in a case of an original having a large size, the threshold value for use in determination of the discharge length may be changed to four-fifths.

As described above, when the jam occurs under a state in which the "halfway return" is set, and the non-discharge length of the original which has not been completely delivered at that time point is larger than a predetermined length, the image reading apparatus 200 instructs the "all return" to a user. When the non-discharge length is smaller than the predetermined length, the image reading apparatus 200 instructs the "halfway return" (FIG. 9) as set by the initial setting.

Figure 13:
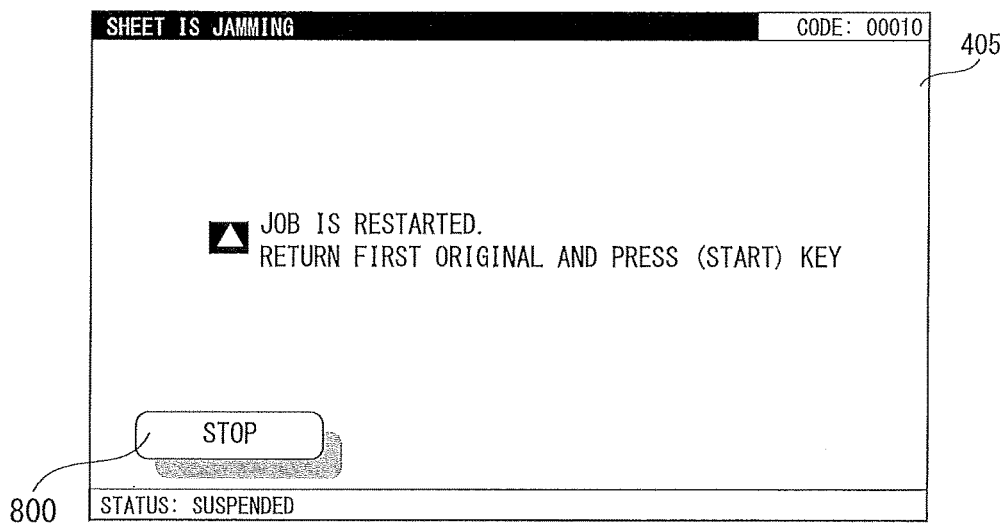
FIG. 13 is a view for illustrating an example of display of an instruction screen for processing with respect to the jam.

Further, also when the image reading processing is stopped due to detection of an unexpected operation, the processing is performed with assumption that the jam has occurred. For example, when unmatching of the count values occurs due to erroneous detection by the sensors provided to the conveyance path 34, the image reading apparatus 200 detects occurrence of the jam. For example, when unmatching such as a case in which the number A of fed originals is larger than the number B of read originals or the number C of delivered originals occurs, the image reading apparatus 200 detects occurrence of the jam. Also in this case, higher priority is given to the determination by the image reading apparatus 200, and the processing after the occurrence of the jam is determined. In this case, the CPU 250 does not restart the reading job, and prompts a user to perform the entire reading job again. The image reading apparatus 200 displays, on the display screen 405 of the console unit 404, an instruction screen of the processing with respect to the jam exemplified in FIG. 13. With this action, all of the originals are read again.

In the image reading apparatus 200 according to this embodiment described above, at the time of occurrence of a jam which may cause difficulty in determination of processing by a user in a case in which the user sets re-placement of unread originals, higher priority is given to a determination result of the apparatus over the setting by a user. With this action, the image reading apparatus 200 can optimally execute the re-reading of originals by the reading job, thereby being capable of efficiently performing re-reading of the originals at the time of occurrence of the jam.

Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s). While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-250599, filed Dec. 26, 2016 which is hereby incorporated by reference herein in its entirety.

What is claimed is:
1. An image reading apparatus, comprising:
an original tray for placing an original;
a conveyance unit configured to convey the original, which is fed from the original tray, to a conveyance path;
an image reader configured to read an image of the original conveyed along the conveyance path;
a jam detector configured to detect occurrence of a jam of the original on the conveyance path;
a sheet discharge tray to which an original having been subjected to reading of an original image by the image reader is discharged; and
a controller, which is configured to stop conveyance of the original by the conveyance unit in a case where the jam is detected by the jam detector, determine, based on a discharged length of a length of an original which stops in the course of being discharged to the sheet discharge tray, a restarting method for reading processing of the original after release of the jam from any one of a first restarting method of re-placing all originals, which have been fed from the original tray, on the original tray and a second restarting method of re-placing an original not having been completely discharged to the original tray, and give a notification of the determined restarting method using a predetermined notification unit.

2. The image reading apparatus according to claim 1, wherein, in a case where the discharge length is larger than a predetermined length, the controller determines the first restarting method as the restarting method, and wherein, in a case where the discharge length is smaller than the predetermined length, the controller determines the second restarting method as the restarting method.

3. The image reading apparatus according to claim 1, further comprising a detector configured to detect the original discharged from the conveyance path to the sheet discharge tray, wherein the controller derives the discharge length based on a time period from detection of the original by the detector to occurrence of the jam and a conveyance speed of the original.

4. The image reading apparatus according to claim 1, further comprising:

a storage portion configured to store a first number of an original fed from the original tray to the conveyance path, a second number of an original having been subjected to reading of an original image by the image reader, and a third number of an original delivered to the sheet discharge tray; and an original presence detector configured to detect presence of an original placed on the original tray, wherein, in a case where the original is not present on the original tray, and the first number, the second number, and the third number are equal to each other, the controller is prevented from giving a notification of the restarting method.

5. The image reading apparatus according to claim 4, wherein, in a case where the reading processing for the original is restarted with the first restarting method, the controller controls the image reader so as to prevent reading of the original image up to the second number.

6. The image reading apparatus according to claim 1, wherein, in a case where the original does not reach a predetermined position even after elapse of a predetermined time period, or in a case where the original does not move from a predetermined position even after elapse of a predetermined time period, the jam detector detects the occurrence of the jam.

7. The image reading apparatus according to claim 1, further comprising a setting portion configured to set in advance any one of the first restarting method and the second restarting method as the restarting method for the reading processing of the original at the time of the occurrence of the jam, wherein, in a case where the second restarting method is set by the setting portion, the controller determines the restarting method from any one of the first restarting method and the second restarting method.

8. A method executed in an apparatus, the apparatus including:

an original tray for placing an original;

a conveyance unit configured to convey the original, which is fed from the original tray, to a conveyance path;

an image reader configured to read an image of the original conveyed along the conveyance path;

a jam detector configured to detect occurrence of a jam of the original on the conveyance path;

a sheet discharge tray to which an original having been subjected to reading of an original image by the image reader is discharged; and a notification unit, the method comprising:

stopping conveyance of the original by the conveyance unit when the jam is detected by the jam detector;

determining, based on a discharge length of a length of an original which stops in the course of being delivered to the sheet discharge tray, a restarting method for reading processing of the original after release of the jam from any one of a first restarting method of re-placing all originals, which have been fed form the original tray, on the original tray and a second restarting method of re-placing an original not having been completely discharged to the original tray; and giving a notification of the determined restarting method using the notification unit.

* * * * *